United States Patent [19]

Lee

[11] Patent Number: 5,692,781

[45] Date of Patent: Dec. 2, 1997

[54] AUTOMATIC LAP AND SHOULDER BELT SYSTEM

[76] Inventor: Kan-Chee Lee, 1939 Greentree Rd., Cherry Hill, N.J. 08003

[21] Appl. No.: 442,670

[22] Filed: May 17, 1995

[51] Int. Cl.$^6$ .................................................. B60R 22/06
[52] U.S. Cl. ................................................ 280/804
[58] Field of Search ........................ 280/801.1, 802, 280/803, 804, 805

[56] References Cited

U.S. PATENT DOCUMENTS

| | | | |
|---|---|---|---|
| 3,891,272 | 6/1975 | Takada | 280/805 |
| 4,213,637 | 7/1980 | Mauron | 280/802 |
| 4,317,583 | 3/1982 | Pilhall | 280/804 |
| 4,451,061 | 5/1984 | Takada | 280/802 |
| 4,508,362 | 4/1985 | Higuchi | 280/802 |
| 4,542,919 | 9/1985 | Else | 280/804 |
| 5,183,290 | 2/1993 | Chung | 280/802 |
| 5,183,291 | 2/1993 | Shah | 280/804 |

FOREIGN PATENT DOCUMENTS

| | | | |
|---|---|---|---|
| 4140167 | 6/1993 | Germany | 280/805 |

*Primary Examiner*—Paul N. Dickson

[57] ABSTRACT

A positive restraint safety system consists of an automatic lap belt and shoulder belt assembly which move simultaneously within two tracks and a rotatable belt position guide, an extendable belt position guide or a trackable belt position guide to restrain or to release a seated occupant in a vehicle. The simultaneous movements of the lap belt, shoulder belt and belt position guide are predetermined by the movements of vehicle wheel, door and engine, and the independent manual switch operation. When the lap belt and shoulder belt simultaneously move from restrained position to released and stand-by position, they move away from the body and above the lap of the seated occupant to a most desired position, therefore all belts are unobtsructing for a driver or passenger to exit from or to enter into a vehicle seat. This automatic, simple and comfortable safety system completely avoids and eliminates the natural problem of forgetting, and always provides a complete positive restraint protection from body injury in the event of a car accident.

2 Claims, 4 Drawing Sheets

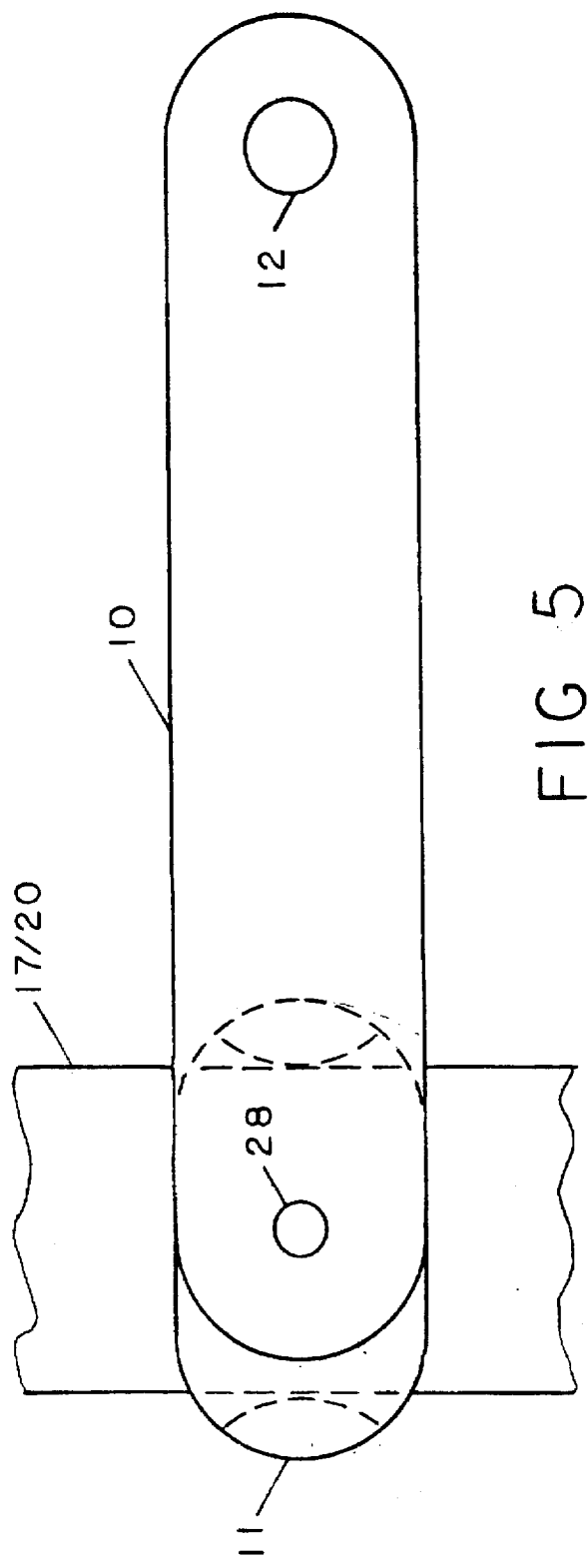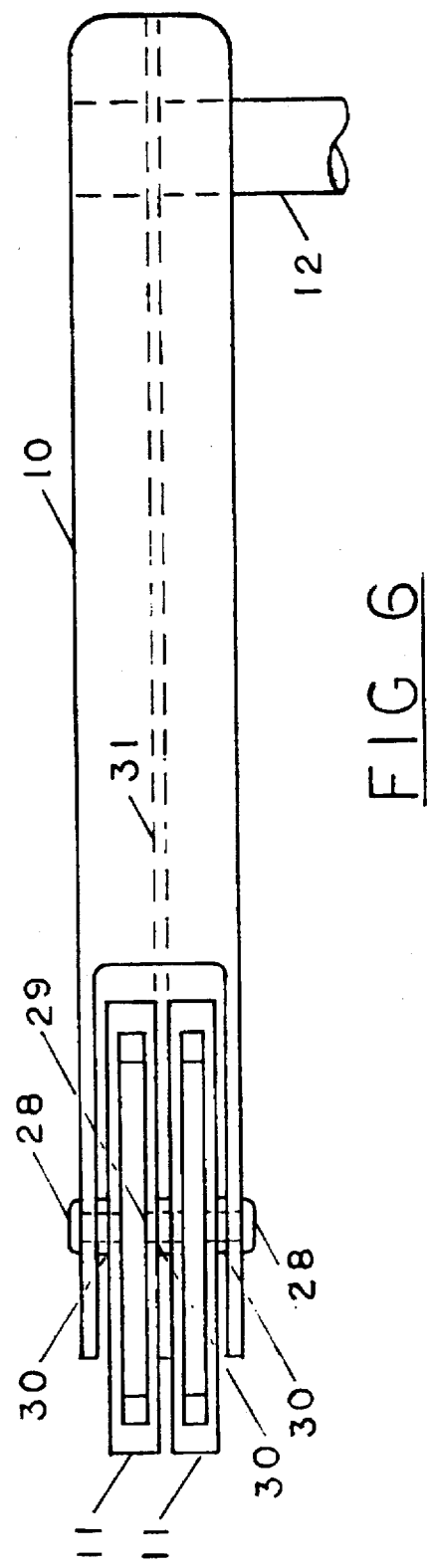

AUTOMATIC LAP AND SHOULDER BELT SYSTEM

BACKGROUND OF THE INVENTION

1. Field of the Invention

The present invention relates to a vehicle driving safety system and more particularly, a belt system.

2. General Background of the Invention

Lap belt and shoulder belt are known as passive restraint for vehicle driving safety. Such belts include one end moving in a track while the other end is disposed in a belt retractor to restrain or release the body of the user. Examples are shown in U.S. Pat. Nos. 5,183,290 and 5,183,291. However, the movement of these belts obstruct and interfere with the arm of the user.

When the automatic shoulder belt first became available, car makers did not remind the car driver and passenger to put on their manual lap belt while the car is running. This resulted in many drivers and passengers suffering body injury in car accidents, and the car makers were sued and lost in many cases. Later on, the law required that the driver and front seat passenger must put on their lap belt and shoulder belt in a moving vehicle. Unavoidably, so many people were fined and suffered because they forgot to put on their lap belt while driving. Perhaps, forgetting is a part of human nature and it will always exist. This is a real problem.

SUMMARY OF THE INVENTION

Accordingly, it is an object of the present invention to provide a simultaneous and automatic lap belt and shoulder belt system to completely avoid and eliminate the problem of the human nature of forgetting.

Another object of the present invention is to provide a simultaneous and automatic lap belt and shoulder belt system at the most desired positions without interfering with the user.

Other objects and scopes of the applicability of the present invention will become apparent from the detailed description given hereafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a simultaneous and Automatic belt system for vehicle driving safety, in which a belt position guide rotates at a pivot end, and it is disposed at the inside edge of the bottom plate of a front seat or disposed in a recess of a rear seat of a vehicle. The belt position guide guides the lap belt and shoulder belt into the most desired position from the restraining position to the releasing position completely moved away from the body of the user. The restraining or releasing movements of the belts are actuated by one of at least five predetermined conditions.

BRIEF DESCRIPTION OF THE DRAWINGS

The present invention will become more fully understood from the following drawings and the detailed description of the invention. The drawing figures are given by way of illustration only, and thus are not limiting of the spirit and the scope of the present invention, in which:

FIG. 5–6 are the side view and top view of a belt position guide with rotatable slots, respectively.

DESCRIPTION OF THE PREFERRED EMBODIMENT

Figure 1:
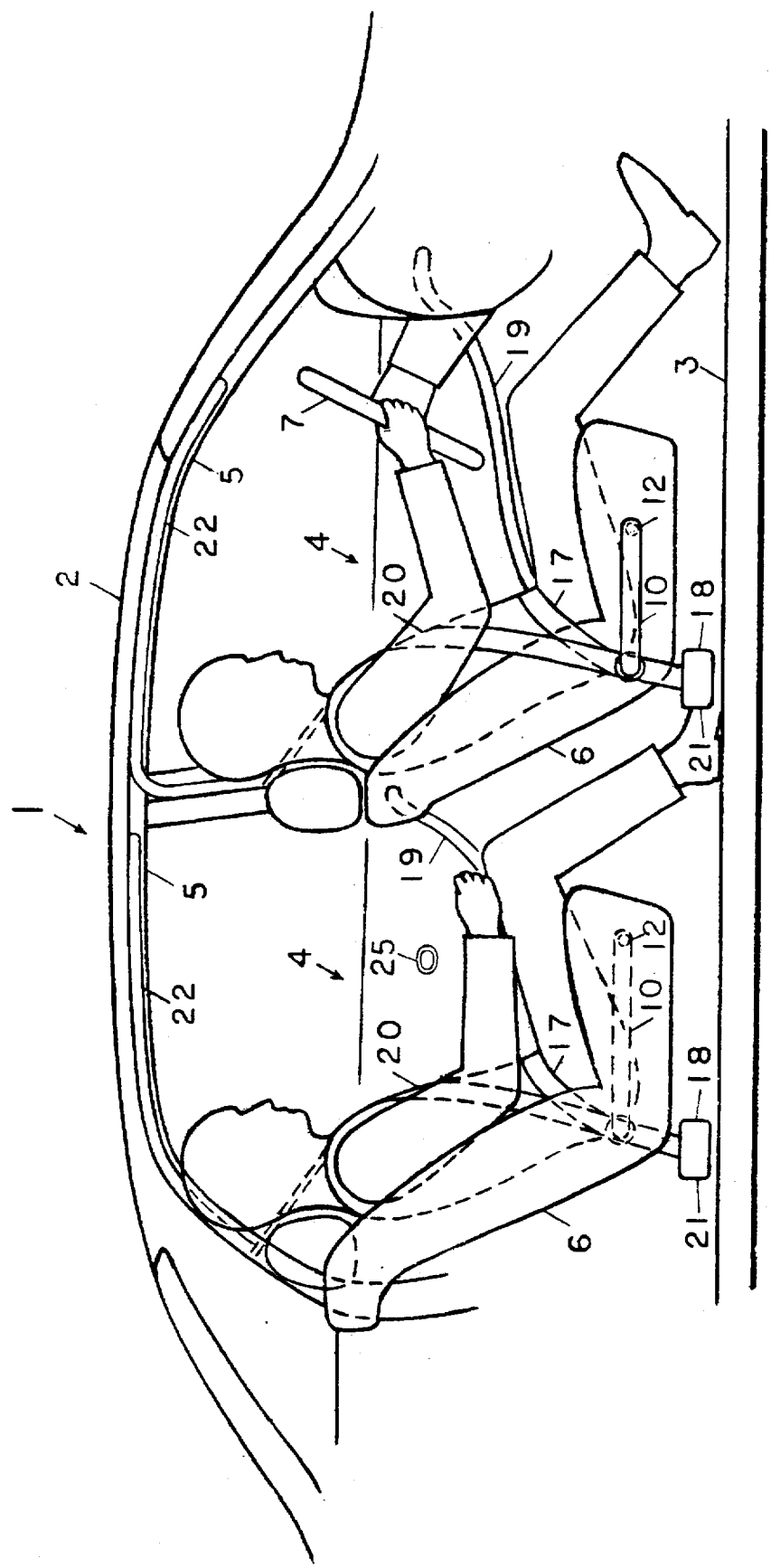
FIG. 1 is the side view of the lap belt and shoulder belt for the seated occupants in restrained position in a vehicle.
Figure 2:
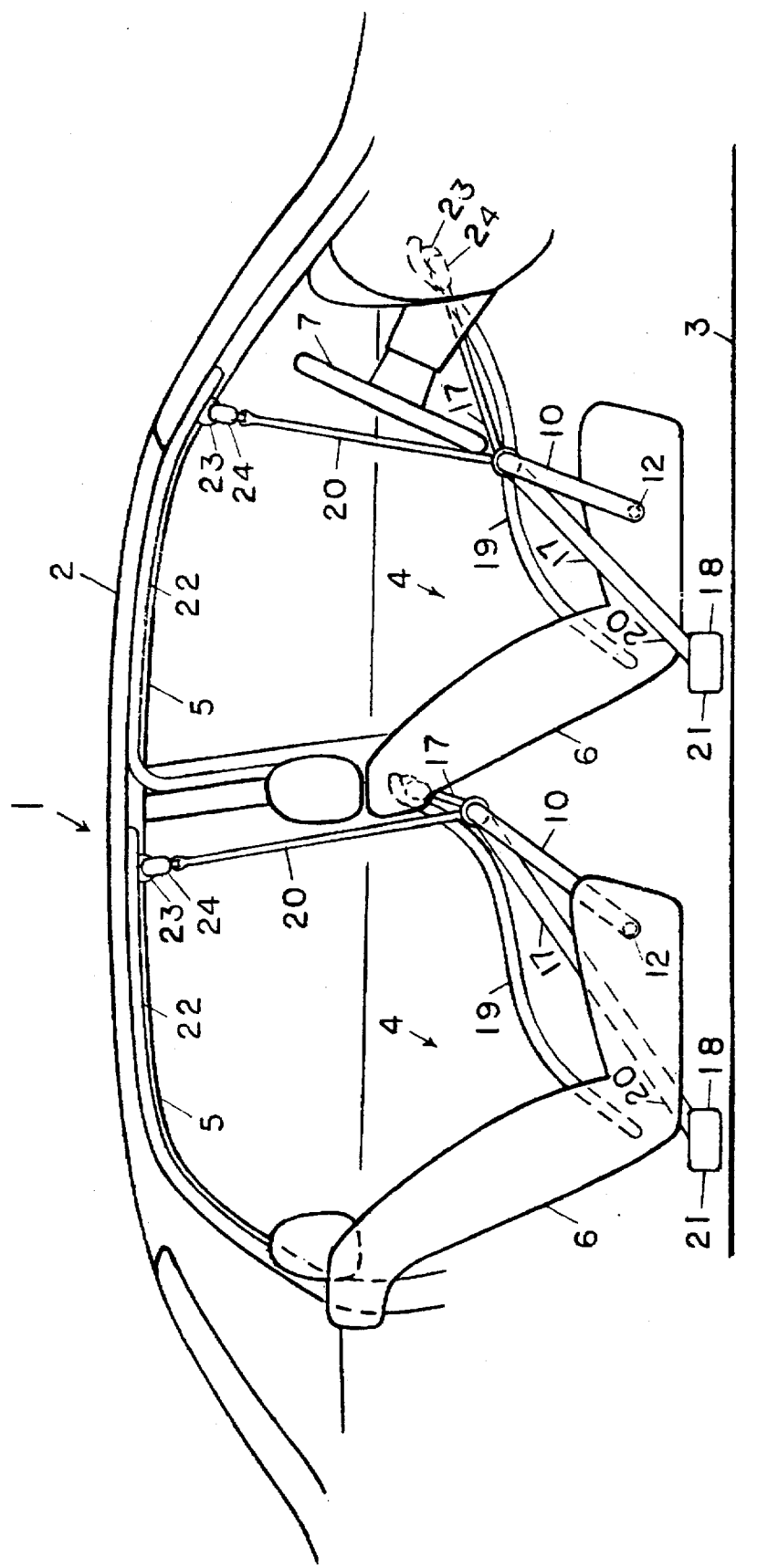
FIG. 2 is the side view of the lap belt and shoulder belt in released position in a vehicle.
Figure 4:
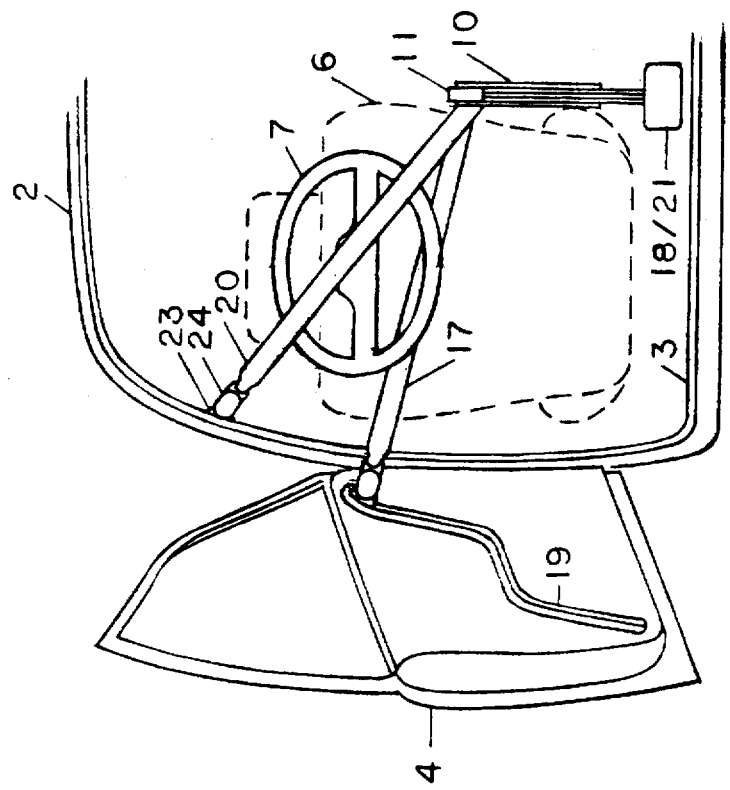
FIG. 4 is the back view of the FIG. 2.
Figure 3:
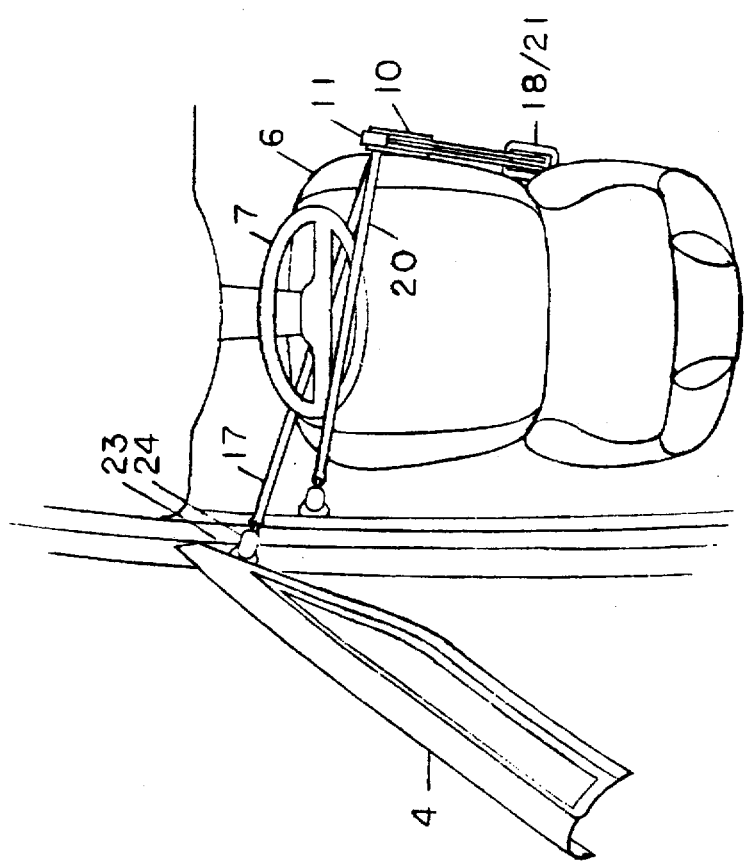
FIG. 3 is the top view of the FIG. 2.

The purpose of illustrating preferred embodiment of the present invention is shown in FIG. 1–6.

The first ends of the lap belt 17 and the shoulder belt 20 are connected to a belt anchor or a pulley 23 travel within the limits of the lap belt track means 19 disposed in the interior lower part of a door 4, and the shoulder belt track means 22 disposed in the interior upper part of a door frame 5 at roof 2 of a vehicle 1, respectively.

The second ends of the lap belt 17 and the shoulder belt 20 pass through the rotatable belt slots 11 into a lap belt retractor 18 and a shoulder belt retractor 21, respectively, which are disposed on floor 3 of a vehicle 1.

A belt position guide 10 has two independently rotatable belt slots 11 at a first end, and a belt position guide rotating mean 12 at a pivot end which is disposed at the inside edge of the bottom plate of a front seat or disposed in a recess of a rear seat of a vehicle. The belt position guide 10 is rotated by a belt position guide rotating means 12.

A lap belt movement means, and a shoulder belt movement means (not shown) are disposed inside the door and the door frame, respectively. When the first ends of the lap belt 17, shoulder belt 20 and the rotatable belt position guide 10, simultaneously travel towards the seat 6 such that the seated occupant is restrained by the lap belt 17 and the shoulder belt 20. While the first ends of the lap belt 17, the shoulder belt 20 and the belt position guide 10, simultaneously travel away from the seat 6 such that the seated occupant is released by the lap belt 17 and the shoulder belt 20.

As shown in FIG. 5–6, two independently rotatable slots 11, two slot outside pins 28 with two washers 30, and one slot inside pin 29 with one washer 30 are at the far end of the rotatable belt position guide 10 in which may have a strengthening plate 31 at the middle.

Manual belt buckles 24 are at the first ends of the lap belt 17 and the shoulder belt 20. Manual switches 25 are disposed at the inside face of the doors within the hand reaching locations.

The automatic lap belt and shoulder belt are actuated simultaneously by one of the following predetermined conditions as shown in the belt operation chart:

| BELT OPERATION CHART | | |
|---|---|---|
| DETERMINATE | AUTOMATIC LAP AND SHOULDER BELT | |
| ELEMENTS | RESTRAINING | RELEASING |
| Wheel | Running | N/A |
| Door | N/A | Wheel stop & door open |
| Engine | Start | N/A |
| Manual Switch | On | Off |
| Manual Belt Buckle | N/A | Release |

I claim:

1. Automatic lap belt and shoulder belt assembly for a vehicle having at least one seat and one door, said lap belt and shoulder belt assembly comprising:

(a) a rotatable belt position guise having two independently rotatable belt slots at a first end, and a belt position guide rotating means at a pivot end of said rotatable belt position guide;

(b) a lap belt having a first end slidably engaged in a lap belt track means, and a second end passing through one of said belt slots of the rotatable belt position guide into a lap belt retractor means;

(c) a shoulder belt having a first end slidably engaged in a shoulder belt track means, and a second end passing through the other of said slots of the rotatable belt position guide into a shoulder belt retractor means; and (d) a lap belt movement means and a shoulder belt movement means for causing the first end of the lap belt and shoulder belt to move within the limit of the lap belt track means and the shoulder belt track means, respectively;

a belt position guide rotating means for rotating the belt position guide within an angular position at the pivot end, wherein the lap belt and shoulder belt automatically and simultaneously move to a restrainted position as a positive restraint for a seated occupant; and automatically and simultaneously move to a released and stand-by position to release a seated occupant, wherein the rotatable belt position guide automatically and simultaneously move the lap belt and shoulder belt away from the body and above the lap of a seated occupant, whereby the lap belt and shoulder belt do not obstruct a user to exit from or to enter into a seat in a vehicle.

2. The automatic lap belt and shoulder belt assembly of claim 1, wherein the lap belt and shoulder belt are moved to a restrained position when either a wheel is running, an engine is started, or a manual switch it turned on; and wherein the lap belt and shoulder belt are moved to a released and stand-by position when either the wheel is stopped and a door is open, the manual switch is turned off or a manual belt buckle is released.

* * * * *